(12) United States Patent
Glasser

(10) Patent No.: US 6,357,357 B1
(45) Date of Patent: Mar. 19, 2002

(54) PROPULSION SYSTEM

(75) Inventor: Alan Z. Glasser, Lake Worth, FL (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/227,070

(22) Filed: Jan. 5, 1999

(51) Int. Cl.[7] ............................ F42B 15/10; F42B 3/00; F02K 9/00
(52) U.S. Cl. ................ 102/374; 102/380; 102/430; 60/253; 60/256
(58) Field of Search .................... 102/289, 374, 102/380, 443, 430, 431; 60/253, 256

(56) References Cited

U.S. PATENT DOCUMENTS

| | | | |
|---|---|---|---|
| 3,138,929 A | 6/1964 | Schatz | 60/39.48 |
| 3,173,252 A | 3/1965 | Ziegenhagen | 60/35.6 |
| 3,388,554 A | 6/1968 | Hodgson | 60/217 |
| 3,434,419 A * | 3/1969 | Dimond et al. | 102/49.3 |
| 5,078,051 A | 1/1992 | Amundson | 102/206 |
| 5,712,445 A | 1/1998 | Kassuelke et al. | 102/288 |

* cited by examiner

Primary Examiner—Michael J. Carone
Assistant Examiner—Aileen J. Baker
(74) Attorney, Agent, or Firm—Nikolai & Mersereau P.A.

(57) ABSTRACT

A propellant burning system and method useful in a rocket motor or projectile firing device burns a continuous main propellant grain of relatively soft propellant material selected from uncatalyzed or partially catalyzed propellants. A separating device divides the propellant grain into a large number of fragments of high-surface area during the burn and an activation mechanism for causing said separating device to operate on the main propellant grain and to ignite and control the burning thereof.

13 Claims, 11 Drawing Sheets

PROPULSION SYSTEM

BACKGROUND OF THE INVENTION

I. Field of the Invention

The present invention relates generally to gas generating propulsion systems and principally those suitable for use in rocket motors or for firing artillery pieces. More particularly, the invention is directed to an improved system for creating high surface area for burning in an uncatalyzed or partially catalyzed bulk propellant mass at high pressure and velocity using a highly efficient separating device.

II. Related Art

The successful firing of rocket motors and large caliber munition cartridges rests in no small measure with the performance of the associated propellants including the repeatable predictability of that performance. Important aspects include loading density and burning rate. However, the two commonly seem to work against each other because dense loads inherently create difficulties in achieving a sufficiently rapid and high, increasing ignition surface area necessary for successful high performance burning.

With respect to ammunition, efforts have been directed toward increasing the amount of propellant available per unit cartridge volume (propellant charge density) without sacrificing burn rate by employing a variety of perforated grain shapes. Bulk liquid propellants have also been used, but have generally exhibited unpredictable burn characteristics.

FIG. 1 depicts a typical large caliber round which may be fired from the main turret cannon of a tank or other large caliber device and having propellant loaded in accordance with one prior art method. The round is shown generally at 10 at FIG. 1 and includes a base plate section 12 connected with the wall of a cartridge casing and having a generally cylindrical portion 14 and a necked down or tapered upper portion 16. The cartridge shell itself is normally made of metal or a combustible material such as molded nitrocellulose or other such material which is consumed during the firing of the shell. The projectile itself is shown at 18 with discarding sabot members 20 and 22 which peel away and drop off just after the projectile is discharged from the muzzle of the cannon. A plurality of stabilizing guidance fins as at 24 are also provided. The nose cone section 26 may contain an electronics package and the warhead section 28 may contain arming and detonating circuitry.

With respect to the firing of the shell, a primer housing shown generally at 30 contains a conductive ignition electrode or primer button (not shown). The primer housing is connected with a generally hollow brass or other type metal primer tube 32 which has a plurality of openings as at 34 which access and address the general propellant charge volume 36. The available propellant charge volume is filled with closely packed, generally uniformly shaped granular solid propellant grains 38 which may be 2 to 3 cm long by about 0.5 cm in diameter.

The shell is normally fired electrically using direct current to ignite the primer in the primer housing and through the primer tube 32, thereby igniting the main propellant 38 via the openings 34. In accordance with improving one aspect of performance, i.e., achieving the highest, repeatable muzzle velocity for the projectile, it is desirable that the propellant burn as rapidly and uniformly (with respect to the load) as possible.

Other propellant configurations have included extruded stick shapes. The propellant manufacture begins with carpet rolled propellant, which is dried, aged, pre-cut for extrusion, extruded with perforations and cut to length. Each length is blended to minimize lot to lot performance variation, and each length must be notched or kerf cut in several places on the side to prevent over pressurization during the burn before the propellant may be used. The loading process for a cartridge using stick propellant is labor intensive and the stick shapes have presented difficulties in achieving high loading densities. Performance is not optimum because of mating surfaces of the sticks, as in the case of random placement with granular propellant.

In addition, repeatability of acceptable or good performance of stick propellant also requires uniformity of the notch or kerf size and web between the kerfs for proper burning. Current extrusion and kerf cutting processes are rarely able to achieve this so that the sticks must be blended or mixed prior to loading to achieve some uniformity. As a result of mixing the stick propellant, performance is not optimized.

Another method utilizing ribbed sheet propellant rolled into cylindrical sections has been tested on smaller caliber ammunition. This method used longitudinal ribs replacing perforations to assist ignition. The rolled method experienced difficulty in conformance to the projectile geometry, poor progressivity, poor flame spread and poor ignition characteristics.

Additional load arrangements for solid propellants are shown and described in Kassuelke et al (U.S. Pat. No. 5,712,445) assigned to the same assignee as the present application. Those loadings are generally in the form of arrangements of closely packed perforated slab or disk-shaped.

There remains a need for a propulsion system that improves pressure control while delivering a high burn rate from a relatively dense load. The present invention represents a different approach to allowing increased loading density in a dynamic system that enables a high, controlled burn rate. Embodiments of the system of the present invention are adaptable to both rocket motor and projectile-firing uses.

In accordance with desirable artillery performance, it is desirable that the pressure history in a launch tube be held nearly constant. This is especially important with respect to higher burning efficiency configurations. An additional goal of manufacture, particularly relevant to cartridge, is to reduce production costs related to shaping grains and labor costs related to loading the shaped grains into the casings. A propellant system which allows increased and more reproducible burning together with lower production and loading costs is very desirable.

Accordingly, it is a primary object of the present invention to provide a system that creates a high surface area propellant at high pressure and velocity from a bulk propellant mass which achieves a controlled burn.

Another object of the invention is to provide an improved propellant system at a lower production cost.

A further object of the present invention is to provide a propellant system wherein a bulk mass of uncatalyzed or partially catalyzed propellant is pressed through a shredder plate with many holes or orifices to create a large number of long, high surface area strings, which simultaneously burn to produce a very high burn rate propellant.

A still further object of the present invention is to create such a system wherein the pressure to force the propellant through the perforated plate can be programmed to suit various design conditions.

A yet further object of the present invention is to provide a system wherein the uncatalyzed or partially catalyzed propellant can itself be used as the pressurization source by suitably adjusting the area of the pressure face on the chamber side versus the bulk propellant side.

A yet still further object of the present invention is to provide a system that provides auto ignition of the propellant strings by a combination of pump work heating and friction between the extended propellant strings and the rims of the holes.

Yet another object of the present invention is to provide a system that can be operated in a stable mode wherein variations and pressure and burn rate are self-correcting to a design rate.

A yet still further object of the present invention is to provide such a system that can be operated in a gun application wherein the system is in an inherently unstable mode in which the pressure tries to increase arbitrarily, but is controlled by an initial shaped volume of inert material that limits the pressure rise until the rate of cavity enlargement is appropriate to the inherent instability of the burn rate that the pressure history can be held nearly constant.

Other objects and advantages will become apparent to those skilled in the art upon familiarization with the specification, drawings and claims contained herein.

SUMMARY OF THE INVENTION

By means of the present invention, a propellant concept is provided in which high burn surface area is generated during the burn by a pressure operated shredding device. The shredding may be accomplished by a rotating cutter device or a highly perforated orifice plate. Relative motion between the propellant grain and the shredding device forces the propellant through the device orifice openings or into cutter blades at high velocity and pressure during the burn to generate a large surface area of propellant from a grain that can be a bulk propellant mass of uncatalyzed or partially catalyzed propellant material having the general consistency of a heavy paste.

The shredder engine concept of the invention using the perforated orifice plate is exemplified by, but not limited to, two basic configurations. They include inherently stable or self-regulating and inherently unstable system configurations. The orifice plate itself is preferably of a spherical shape to maximize shape stability and minimize necessary thickness and pressure loss. The system can be designed to provide auto ignition derived from heat generated by the pressurization of the propellant and the friction between propellant and rims of the orifice openings by making the orifice plate from a material having relatively low thermal conductivity thereby allowing additional heat buildup. In one inherently stable configuration, a highly perforated stationary orifice member is located toward the nozzle or outlet of a rocket motor case or the projectile-containing end of a shell cartridge. A similarly shaped, possibly congruent, and preferably hollow piston member is located at the opposite end and partially encloses or is adjacent to a small charge and an igniter. The orifice and piston are separated by the main propellant charge. The burning of the main propellant charge occurs beyond the orifice plate in a region called the chamber, fixed in size in the case of a rocket motor nozzle, but ever-lengthening with movement of the projectile in the case of a gun.

In operation, this system is essentially self-regulating to a design pressure particularly in the case of a rocket motor in which the chamber volume is fixed. The charge behind the piston has a burn rate that is generally fixed by its surface geometry. The dynamics of the system remain stable because:

(1) if the pressure in the chamber drops, the $\Delta p$ between the chamber and the pusher charge will increase, causing the flow rate of the propellant to increase and, in turn, increase the chamber pressure;

(2) if the chamber pressure increases above the design level, the $\Delta p$ between the chamber and the pusher charge decreases, causing the propellant flow rate into the chamber to decrease, which, in turn, decreases the chamber pressure.

In essence, the system hunts to find its design level. This type of system is ideally suited to rocket applications where constant thrust is desired.

In a second configuration, the orifice plate moves away from the projectile or rocket motor nozzle and through the main propellant grain. The system is ignited using a small ignition charge at the projectile or nozzle side of the orifice plate of the system. In this embodiment, the highly perforated orifice plate is carried by a slender central stem or rod which is designed to collapse as the shredder orifice moves aft.

The $\Delta p$ needed to pump the propellant through the orifice plate in this case is governed by the ratio of the orifice stem area to the chamber area. The force on both sides of the orifice plate must be equal so that:

$$p_c A_c = P_p (A_c - A_s)$$

where subscript "p" denotes conditions in the propellant and subscript "s" denotes the stem. Given the above, it will be recognized that the pumping action is purely a function of the geometry. No pusher charge is needed and the ignitor charge has ignition as its sole function providing pressure and flame to get the process started. In one sense, then, the second orifice system is simpler and more efficient that the first, however, the second system is not inherently stable. As will be explained, this condition makes the system well suited to an application where instability may fit the requirement perfectly as is the case with a gun-launched projectile.

In a conventional powder operated gun, the powder burns almost all at once. The pressure rises in a spike and then as the bullet gathers speed and distance the pressure decays rapidly. Modern gun propulsion technology is concerned with extending the peak pressure over time such that the integrated work is maximized and the peak pressure is reduced. This is also the effect that the embodiment of the present invention achieves, particularly if an inert start-up wedge of shreddable material is used about the outer periphery of the orifice plate. The pressure can then be tailored to be approximately level and the peak broadened considerably. The function of the inert start-up wedge is to allow the propellant feed into the chamber to be progressive in rate as the distance and velocity of the projectile both increase. The shape of the pressure curve is, thereby, modulated by the shape of the inert wedge and advantage is gained from the configuration's tendency toward ever higher feed rates.

Another embodiment of the propellant system of the present invention includes a multi-edge or multi-blade, high speed, rotating shredder screen which pulls a cylindrical or annular tube of solid propellant through the blades and into a fixed nozzled combustion chamber which contains an annular start-up grain and a set of radially mounted spin vanes. Bore riding obturators are provided for and aft to increase efficiency. This embodiment is particularly well suited for use in a recoilless gun arrangement.

BRIEF DESCRIPTION OF THE DRAWINGS

In the drawing figures wherein like numerals depict like parts throughout the same:

FIG. 4 is a graphical representation of travel VS pressure of a gun tube using the round of FIG. 3A;

DETAILED DESCRIPTION

The gas generating propulsion system of the present invention is described herein with reference to rocket motors and large caliber guns. These embodiments are presented to illustrate examples of uses for the concepts and clearly are not meant to be exhaustive. Thus, in addition to using the system to generate hot, high pressure gas that may be passed through a nozzle to power a fast burning rocket engine or to push a projectile from a gun tube at high velocity, the gas generating system of the present invention can generate gas for other purposes such as rapid inflation or heating of a volume and, depending on the chemical make-up of the charge to generate quantities of a specific molecular substance.

Figure 1:
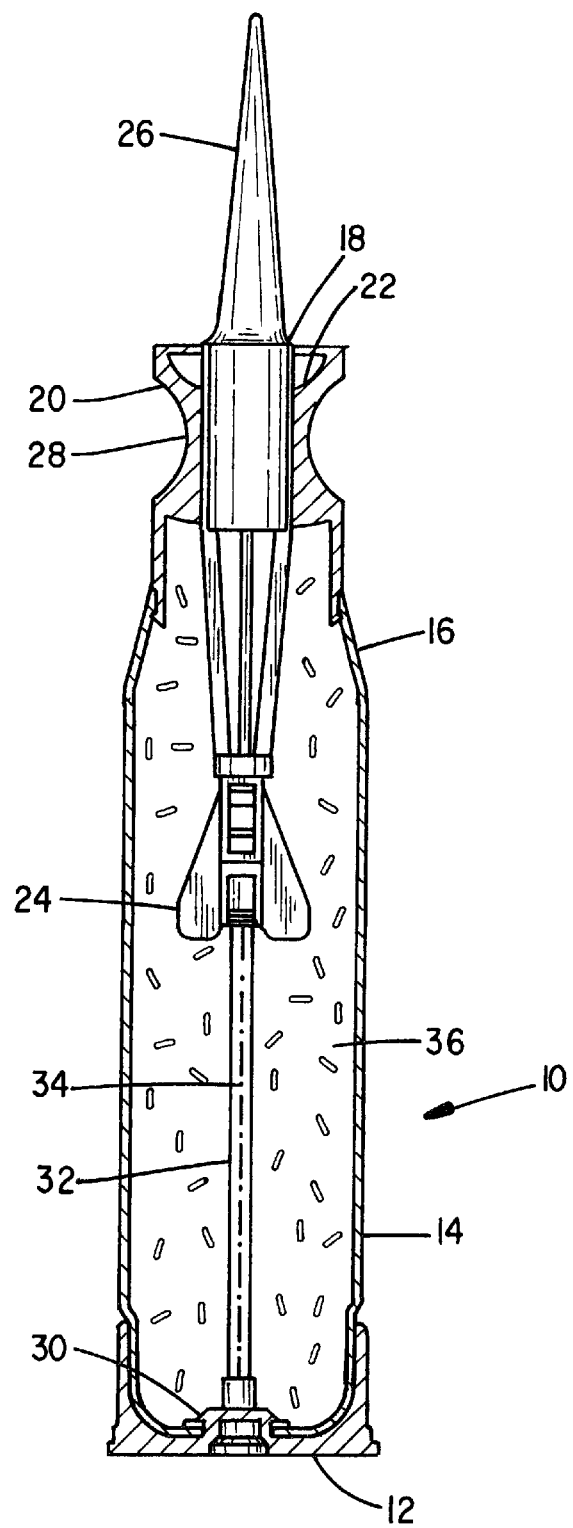
FIG. 1 is a schematic view, partially in section of, a typical large caliber munition round of a class suitable for use with the propellant of the invention shown loaded with a type of extended granular-shaped propellant of the prior art.
Figure 2:
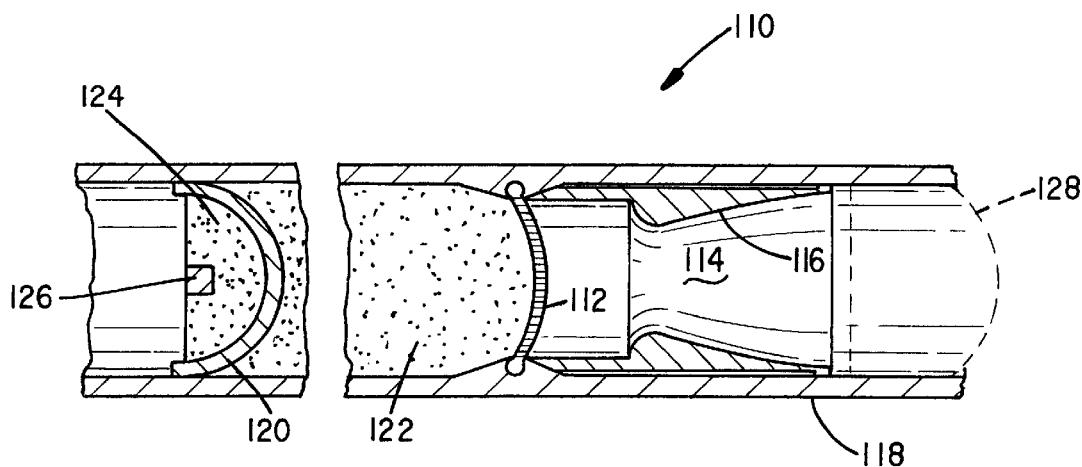
FIG. 2 is a fragmentary schematic view, partially in section, of the nozzle area of a rocket motor showing one adaptation of the invention.

FIG. 2 is a fragmentary schematic view, partially in section, depicting a gun tube or rocket motor generally at 110, which includes an adaptation of the present invention using a stationary, highly perforated orifice member 112 mounted upstream of a combustion chamber 114, having a fixed volume and a discharge nozzle 116 within a gun tube or rocket case 118. The system also includes a free-moving, generally hollow piston member 120 carried beyond a soft, solid main propellant charge or grain 122 and containing a pusher charge 124 and an igniter 126. A portion of a projectile is shown in phantom at 128 as indicative of the use of the system alternatively in a gun tube. The geometry of the inner surface of the orifice member 112 and the outer surface of the piston member 120 preferably similar or congruent to maximize the propellant driven through the orifice by the piston during the operation of the system. The main propellant charge is preferably a bulk mass of uncatalyzed or partially catalyzed propellant having the consistency of a soft paste.

Figure 4A:
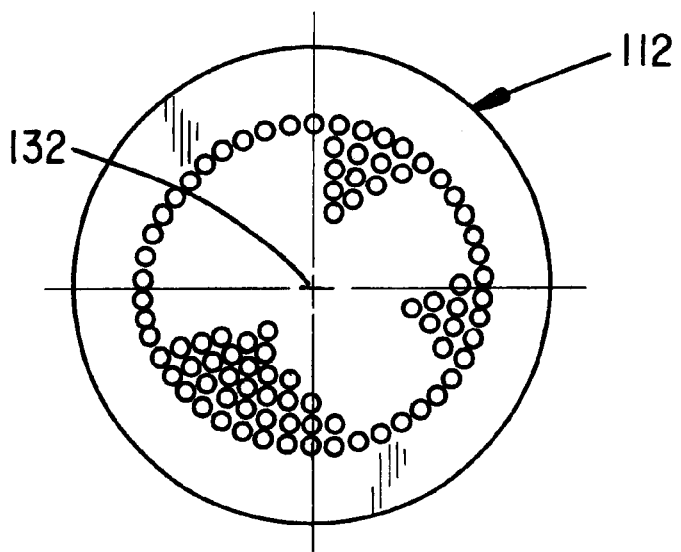
FIG. 4A is a plan view showing one embodiment of an orifice plate in accordance with the invention.
Figure 4B:
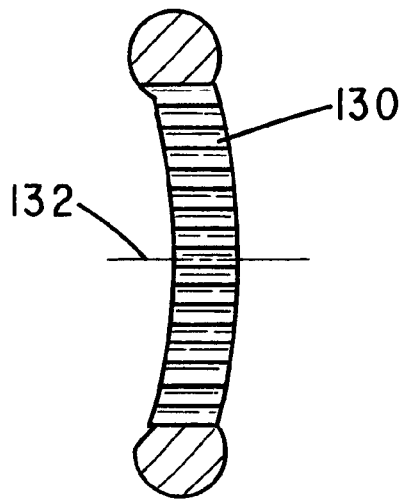
FIG. 4B is a side elevational view of the orifice plate of FIG. 4A.

The highly perforated orifice member is preferably one of a class typified by FIGS. 4A and 4B containing a large number of relatively small openings or passages 130 generally radially distributed and equally spaced about the central axis 132. The exact size and number of holes will vary with the diameter and application of the orifice. Typically, the holes are from about 0.02 to about 0.08 in diameter and spaced accordingly from about 0.03 to about 0.10 on center. The orifices are generally steel, heat treated to a hardness (Rockwell "C") of 50–53. The pistons are preferably nylon or equivalent plastic and, as indicated, may be of congruent shape to nest against the orifice during the operation of the system.

Figure 3A:
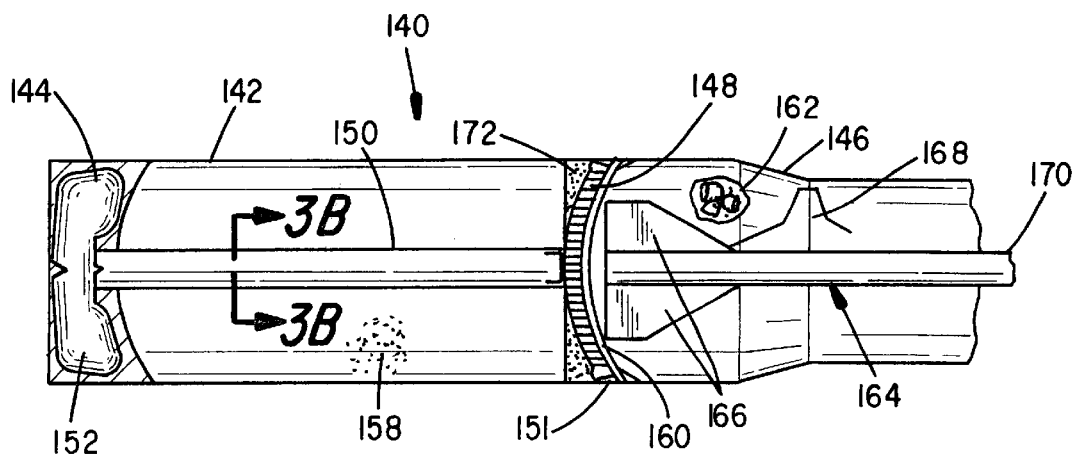
FIG. 3A is a partial schematic view, partially in section, of a typical large caliber munition round configured in accordance with another embodiment of the invention.
Figure 3B:
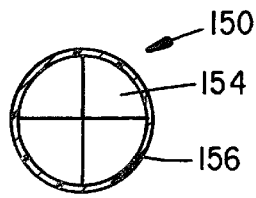
FIG. 3B is a sectional view of the orifice plate stem of FIG. 3A.

FIG. 3A is a fragmentary schematic view, partially in section, depicting a large caliber artillery round, generally at 140, which may be a 120 mm tank round. The round includes a combustible cartridge case 142 which is normally nitrocellulose with a base 144 and a necked-down transition at 146. A movable orifice plate is shown at 148 held in place by a peripheral shoe 151 or obturator seal, typically of copper, and a collapsing orifice plate stem 150 designed to collapse into a storage volume 152. As shown in FIG. 3B, the rod 150 is typically of a multi-piece configuration or construction and may be made up of four wedges 154 possibly of mild steel, lightly soldered together and designed to peel apart rapidly. The rod may be wrapped by a layer of tape 156. Stems utilizing a six-piece aluminum stem construction have also been used.

Whereas the orifice plate 148 is shown in a concave forward posture, a concave aft design may also be employed. The posture of the orifice in the final analysis might well depend on the quality of the obturator seal obtained.

The main propellant charge 158 is located between the orifice and the base and a relatively thin ignition layer 160 is located adjacent the projectile side of the orifice to initially ignite a small grained conventional charge 162 (typically about 1–4 pounds) which is distributed about the aft portion of a projectile illustrated at 164 having guidance fins 166 and a discarding sabot, shown in part at 168, and a penetrator rod 170.

The system further, preferably includes a peripheral toroidal start-up wedge 172 of shreddable inert filler material which can be sized to function to tailor the system to a particular gun operation application. The wedge helps to control pressure build-up in the chamber by slowing the initial gas generation rate.

As previously indicated, while both are highly successful, the two basic orifice embodiments have different ultimate attributes. The operation of the system of FIG. 2 is inherently stable and self-regulating, whereas that of FIG. 3A is somewhat more efficient, but less stable. The former hunts to find its design pressure generation level and stabilizes about that value relative to a fixed chamber volume which is particularly well suited to rocket propulsion or recoilless gun operation. The later achieves an ever-increasing burn rate which tends to sustain the peak pressure in an ever-increasing chamber volume which makes it ideally suited to launching a gun projectile.

Operation of the stable system of FIG. 2 is initiated by igniting the charge 124 behind the piston 120 which drives the piston against the main propellant charge 122, thereby forcing it through the passages 130 in the orifice plate 112 in a manner such that in accordance with one aspect of the invention, the pump piston and the friction between the extended propellant strings and the rims of the passages 130 produces sufficient heat to ignite the propellant which is consumed in a stable mode, as previously described, wherein variations in pressure and burn rate are self-correcting to a design rate.

At gun pressures, the density of the gas used to push the piston is less than the density of the propellant so that for every pound of useful propellant, there is an amount of pusher charge that is not necessarily available for useful work. It is possible that the piston can be pushed through the orifice plate to allow these high pressure gases to enter the gun tube or rocket engine area; however, there is work lost in getting rid of the piston and valuable space taken by the piston. Furthermore, the shaping of the pusher charge to achieve appropriate surface burn area will consume volume. All of this represents a penalty for the stable system. In the Secondary system, the only volume lost is that of the inert toroidal wedge. Furthermore, the use of the Secondary configuration facilitates the implementation of shredder with existing combustible case designs.

Figure 6:
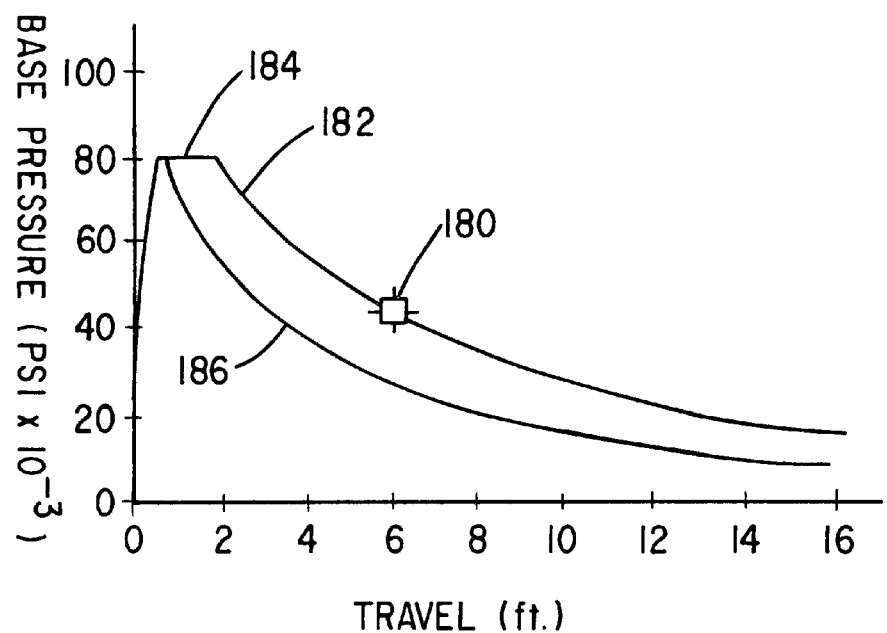
FIG. 6 is a graphical representation showing the relation of base pressure VS travel for an embodiment such as that of FIG. 3A.

FIG. 6 depicts graphically a typical theoretical pressure-distance profile for a present-day stepped-down barrel of an artillery piece using the propellant system of FIG. 3A. The critical point 180 represents the first wall thickness reduction of the tube encountered beyond the breech which, in turn, reduces the maximum allowable tube pressure. Improvements in tube construction and materials may remove this restriction, but the figure illustrates maximization of pressure for that tube made possible by using one propellant system of the present invention. This is shown along line 182, in view of the ability to sustain the peak pressure for a distance at 184, as opposed to the typical prior art curve 186 which includes a sharp peak and quick decay with missile travel.

Figure 7:
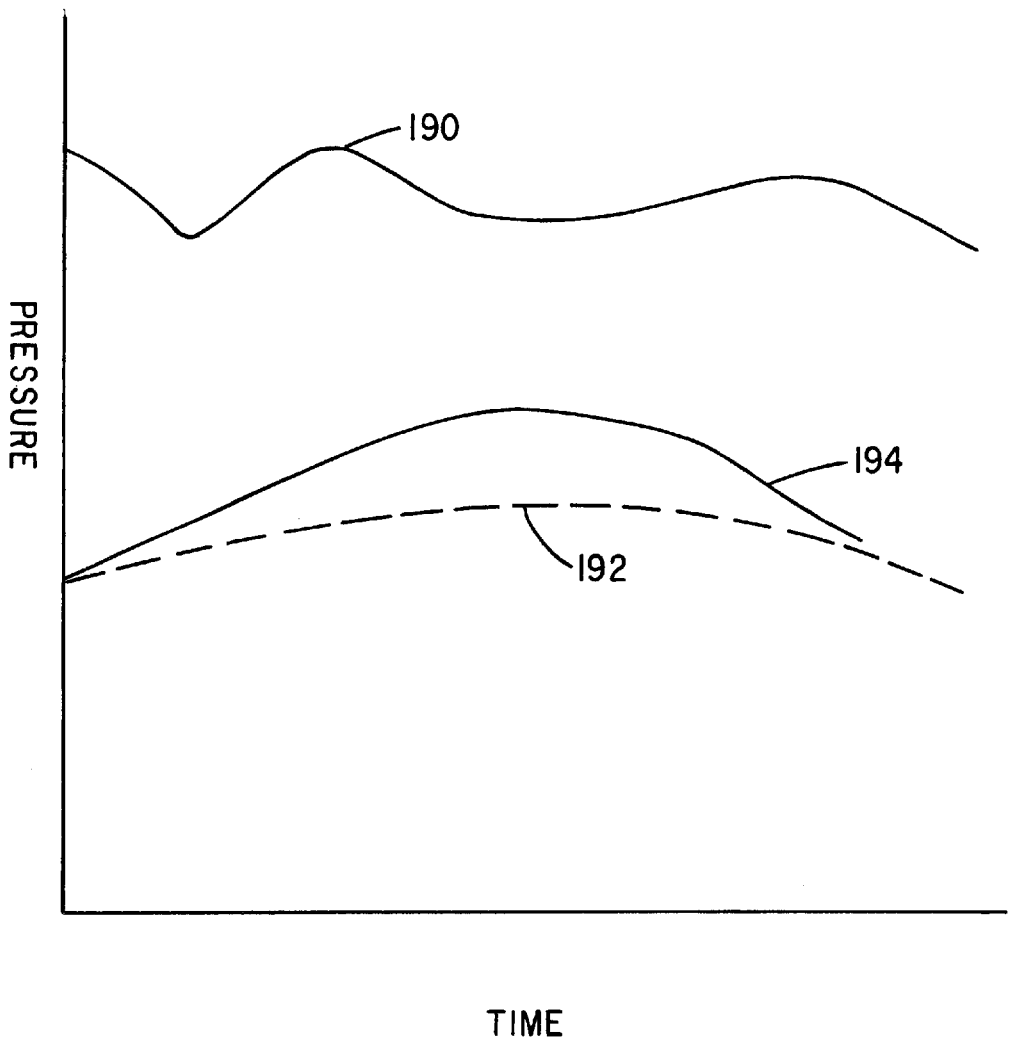
FIG. 7 is a general graphical representation showing the dynamics of gun system configurations using the stable and unstable systems.

FIG. 7 graphically represents the operation of the stable and unstable propellant systems in general pressure v. time curves. The operation of the stable system of FIG. 2 is represented at 190 in which the pressure is seen to be controlled within a relatively narrow range.

The curves 192, 194 show the dynamics of the system of FIG. 3A with and without the start-up wedge 172, respectively. This clearly illustrates the value of the wedge in an expanding volume system. This figure illustrates the initial part of the burn.

Figure 8A:
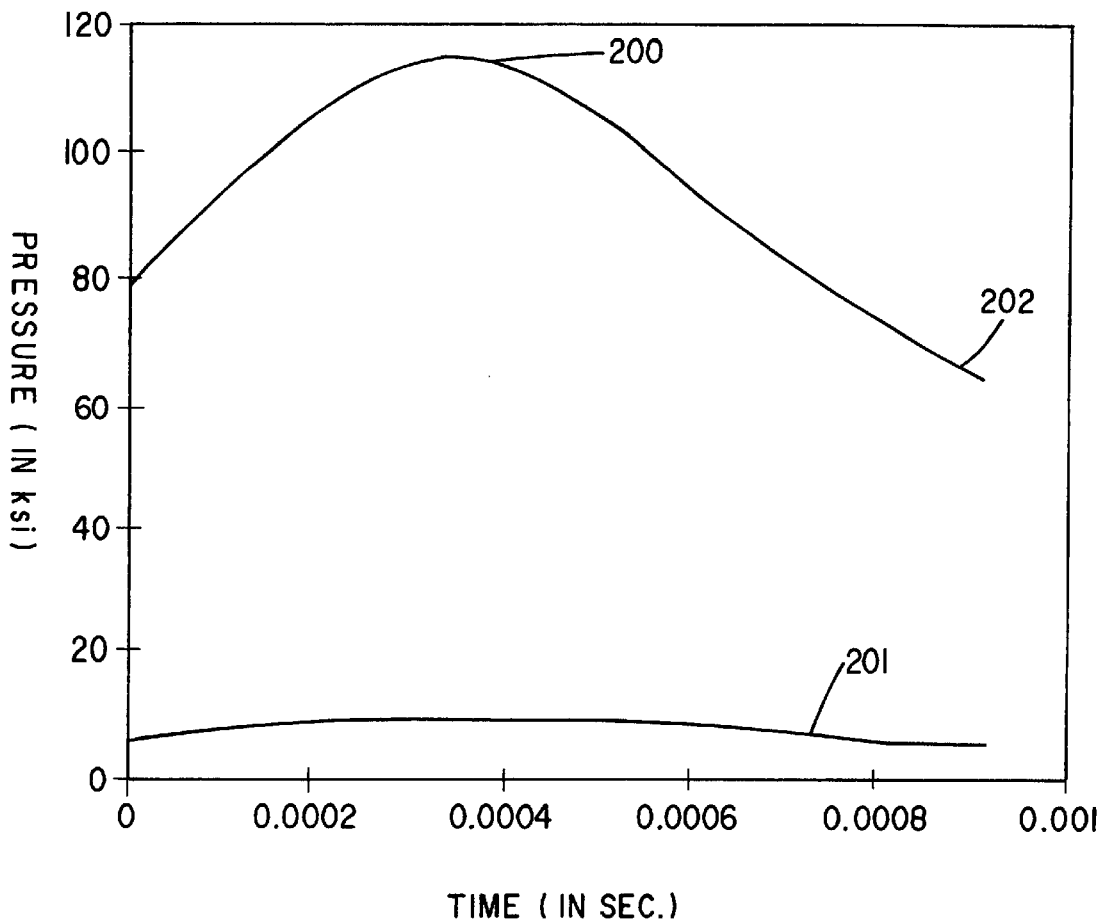
FIGS. 8A–8C are simulated pressure history representations of characteristics of the operation of the unstable system of FIG. 3A.
Figure 8B:
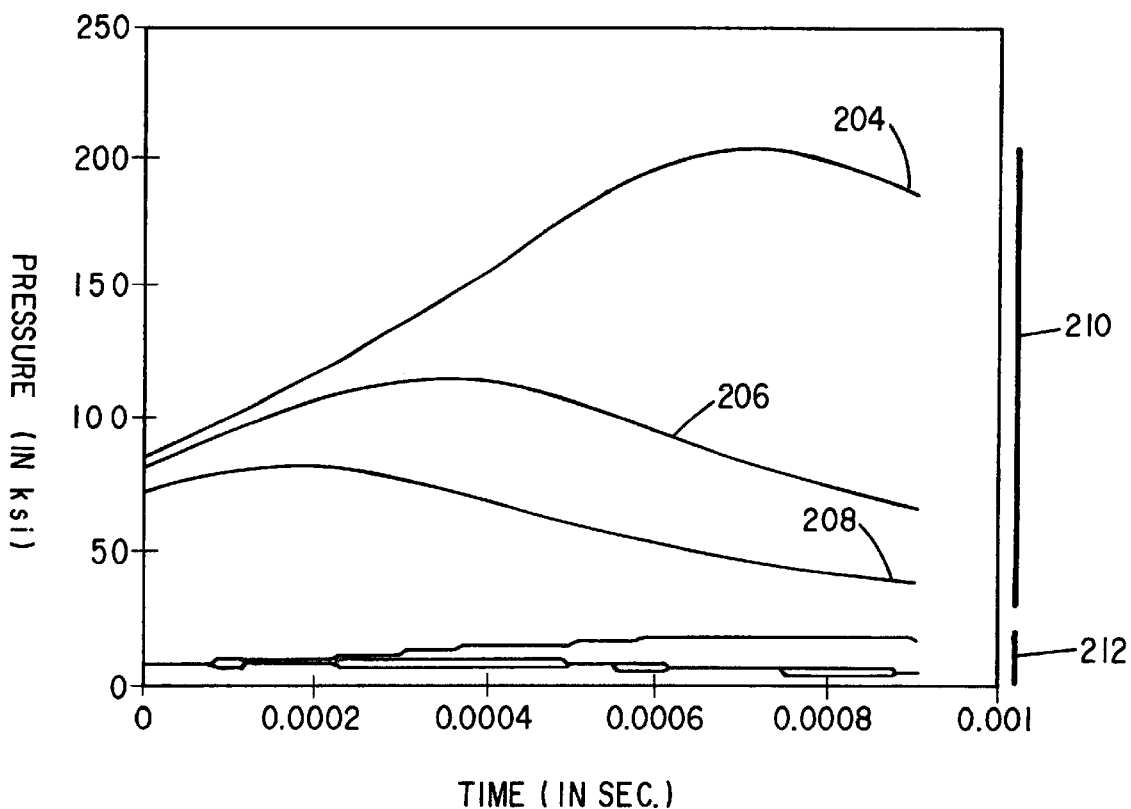
Figure 8C:
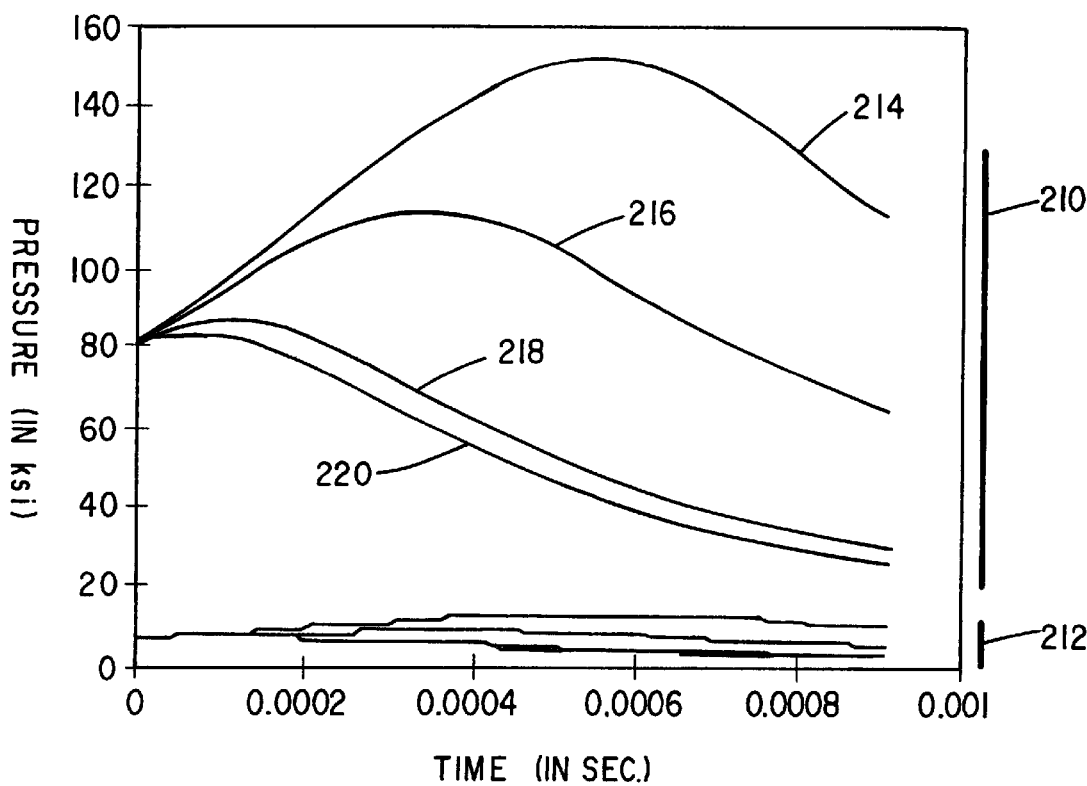

Further details of the operation of the inherently unstable system of FIG. 3A are shown in the theoretical or simulated pressure history curves of FIGS. 8A–8C. FIG. 8A depicts a simulated firing chamber pressure history in the upper curve. The delta ($\Delta$) P curve 201 represents pressure over and above the chamber pressure generated to operate the shredding device of the invention. In this instance, the value is less than about 10 ksi. The peak pressure shown at 200 is about 114.6$^+$ ksi with a $\Delta$P of about 9.37 ksi occurs at 0.35 milliseconds. The graph ends at muzzle exit 202 which occurs at 0.85 milliseconds. The pressure at exit is 69.6$^+$ ksi with an exit velocity of 761$^+$ fps.

The plots of FIG. 8B show the sensitivity of the unstable system to variations in initial pressure. Each of the set of curves 204, 206 and 208 represent corresponding initial pressures of 82.3 ksi, 80.0 ksi and 70.0 ksi, respectively. A significant increase in system pressure appears to occur when the corresponding initial pressure is above about 80 ksi. The total range variation is shown by 210 and the corresponding $\Delta$P range, by 212.

The plots generated in FIG. 8C represent the reaction of the unstable system to variations in propellant viscosity illustrating chamber pressure and $\Delta$P characteristics for four different viscosities. As the curves 214, 216, 218 and 220 depicts, the system appears to be highly sensitive to small variances in viscosity and raising or lowering the viscosity significantly from about 3.2 kP in the model results in greatly reduced performance.

Figure 9A:
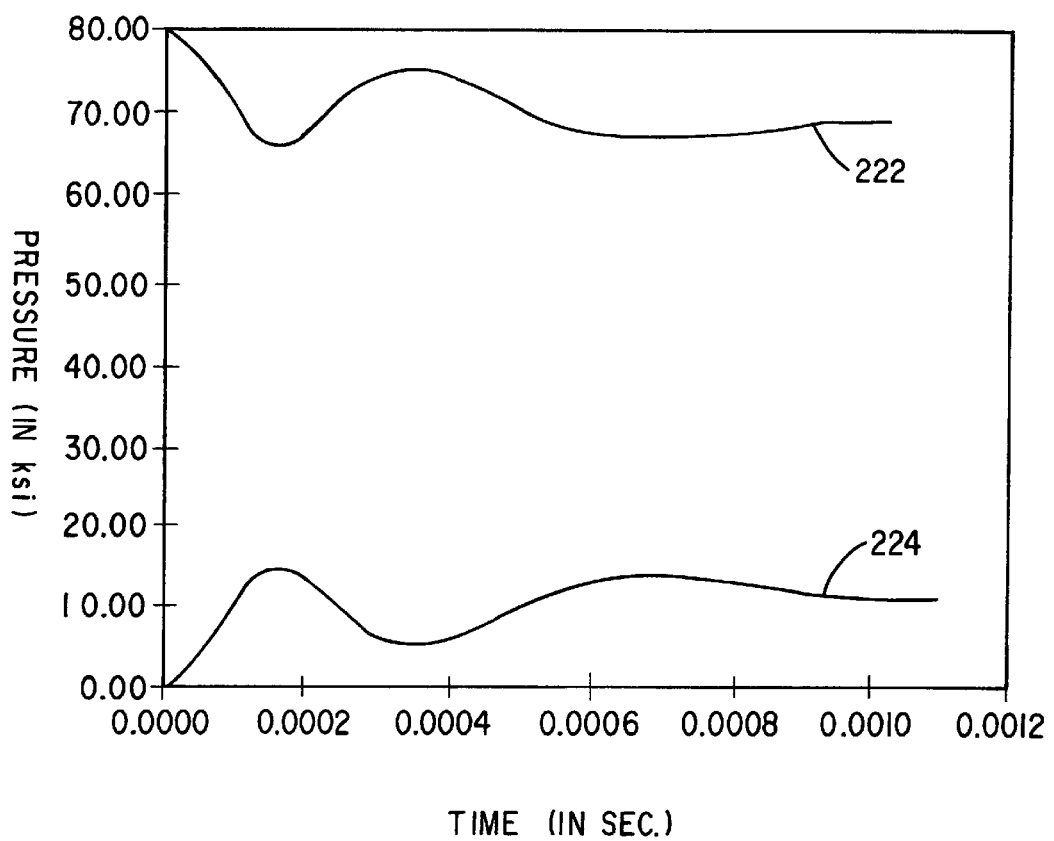
FIGS. 9A–9C are simulated pressure history representations demonstrating characteristics of the operation of the stable system of FIG. 2.
Figure 9B:
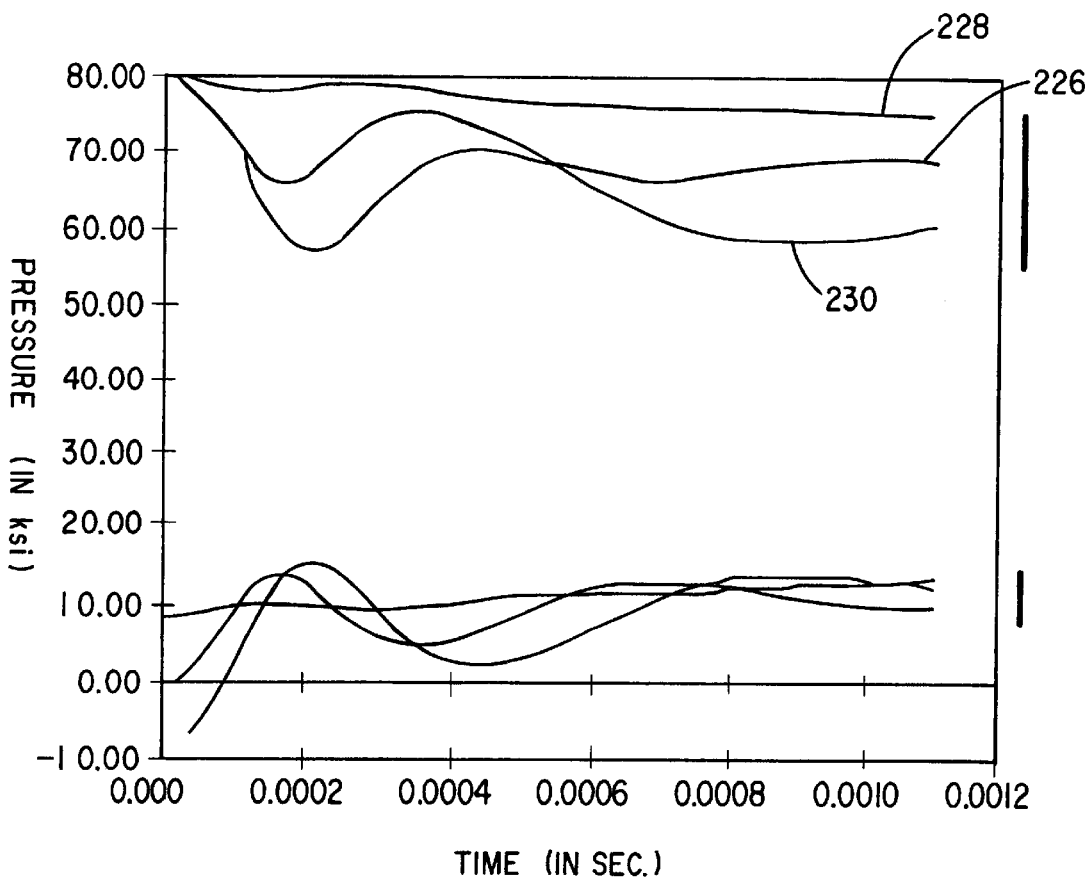
Figure 9C:
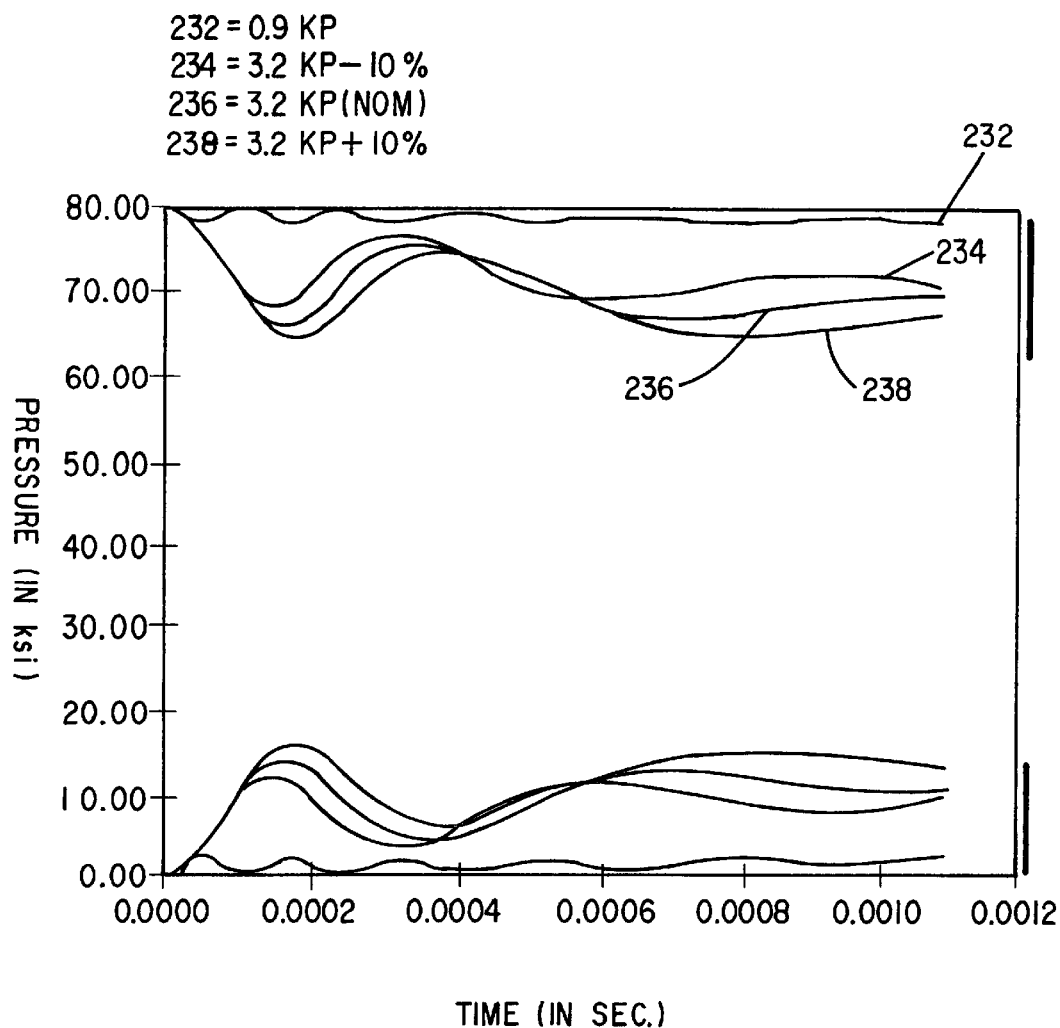

Further representation of the fundamental characteristics of the inherently stable system of FIG. 2 may be found in the additional simulated or model pressure history curves of FIGS. 9A–9C. Note that at exit (0.98 milliseconds) in FIG. 9A both the pressure curve 222 and the $\Delta$P curve 224 have substantially damped and stabilized.

In FIG. 9B, it is apparent that, unlike with the unstable system, the stable system is not greatly sensitive to initial driver or piston pressure. With 226 as an average (80 ksi) curves 228 and 230 illustrate +10% (88 ksi) and –10% (72 ksi) respectively.

Finally, with respect to the operating characteristics of the stable system, FIG. 9C demonstrates that this system is relatively insensitive to even large variations in propellant viscosities. This is apparent from the relatively narrow range of chamber pressures, particularly when compared with the corresponding reaction of the unstable system in FIG. 8C.

Figure 5:
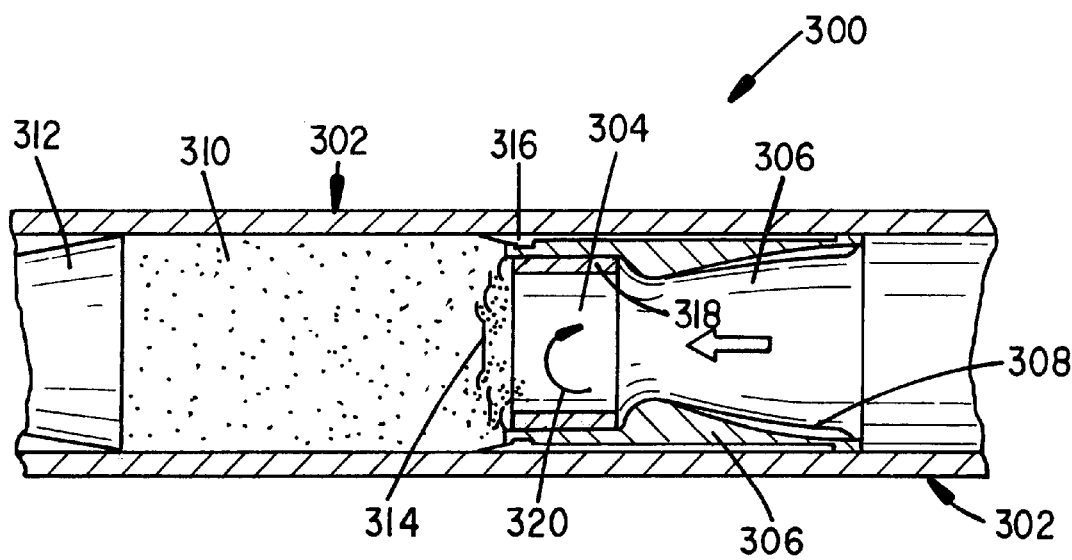
FIG. 5 is a fragmentary schematic view, partially in section, of another embodiment using a rotating shredder screen.

FIG. 5 depicts an alternative embodiment of the propellant system of the invention, generally at 300, which may be a recoilless system, including a gun tube 302 with a combustion chamber 304 and nozzle system 306 with spin vanes 308 formed therein. A main propellant grain containing soft uncatalyzed or partially catalyzed solid propellant is shown at 310 aft of a projectile or payload 312 and in front of a shredder screen 314 designed to rotate at high speed during the burn. The system further includes an annular bore-riding obturator 316, which essentially seals the periphery about the shredder screen and between the shredder screen and the combustion chamber. An annular propellant start-up grain is shown at 318 and the direction of the shredder rotation is indicated by arrow 320.

In this embodiment, ignition of the start-up grain 318 in cooperation with the spin vanes 308 initiates the rotation of the shredder screen 314 which, in turn, chews through the propellant grain 310 creating a high surface area by forcing the propellant through a relatively fine screen and pulling the entire grain through the screen.

This invention has been described herein in considerable detail in order to comply with the patent statutes and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A main propellant burning system for a rocket motor or projectile firing device comprising:
   (a) a propellant grain of relatively soft propellant material selected from the group consisting of uncatalyzed or partially catalyzed propellants;
   (b) a shredding device for dividing said propellant grain into a large number of fragments of high-surface area; and
   (c) activation mechanism for causing said separating device to operate on said main propellant grain and to ignite and control the burning thereof.

2. The propellant burning system of claim 1 further comprising:
   (d) a combustion chamber of fixed volume and a discharge nozzle, and
   (e) wherein said activation mechanism includes a moving pusher device to drive said propellant through said orifice plate into said combustion chamber.

3. The propellant burning system of claim 2 wherein said pusher device is a piston containing a piston propellant charge and further comprising an ignition system for igniting said piston propellant charge.

4. The propellant burning system of claim 3 including control means for controlling the speed of said piston to maintain a desired pressure in said combustion chamber during the burning of said propellant grain.

5. The propellant burning system of claim 1 wherein said orifice plate is located between said propellant grain and a projectile to be fired and wherein said activation mechanism includes a minor charge of propellant about the aft portion of said projectile and ignition means for igniting said minor charge and causing said orifice plate to begin to move through said propellant thereby shredding additional propellant passing through said orifice plate.

6. The propellant burning system of claim 5 further comprising collapsing stem device beyond said orifice plate for controlling the speed of said orifice in said propellant.

7. The propellant burning system of claim 6 wherein said orifice plate has a concave forward posture.

8. The propellant burning system of claim 7 further comprising a toroidal start-up wedge of shreddable inert material to control initial pressure build up between said orifice plate and said projectile.

9. The propellant burning system of claim 8 further comprising an obturator seal associated with the periphery of said orifice plate.

10. The propellant burning system of claim 9 wherein said perforations in said orifice plate, said collapsing stem, and said toroidal start-up wedge are sized to combine effects to limit and prolong the maximum pressure behind said projectile during the burn of said propellant, grain.

11. The propellant burning system of claim 6 wherein said collapsing stem means contains multiple segments which peel away from each other during the collapse.

12. The propellant burning system of claim 1 further comprising a combustion chamber of fixed volume and having an entry and a discharge opening, a nozzle beyond said combustion chamber, said nozzle containing spin vanes, and an annular start-up grain in said combustion chamber and wherein said separating device is a rotating shredder screen located near the entry end of said combustion chamber.

13. The propellant burning system of claim 4 wherein the speed of said piston is controlled by the pressure balance between pressure created by said piston propellant charge and pressure generated in said combustion chamber.

* * * * *